United States Patent Office 2,731,353
Patented Jan. 17, 1956

2,731,353
DE-ICING MATERIAL

Jacob M. Fain, Brooklyn, Norman L. Hewitt, Scarsdale, and William Rosenblatt, Brooklyn, N. Y., assignors, by mesne assignments, to the United States of America as represented by the Secretary of the Navy No Drawing. Application June 9, 1953,
Serial No. 360,592

10 Claims. (Cl. 106—13)

This invention relates to a de-icing composition having particular utility when applied as a coating to aircraft parts.

In aircraft uses the formation of ice and frost on wings, control surfaces, fuselage and other exposed areas poses a serious problem; and the need of effective ice removers is apparent whenever ambient temperature moves below the freezing point, especially within the 25° F. to —15° F. range.

The objects of the invention are to provide a de-icing and defrosting coating for weather exposed surfaces which is effective in sub-freezing temperatures to at least —15° F.; which will prevent re-formation of ice after removal for considerable time periods dependent upon the amount of precipitation encountered; which shall have no adverse effect on materials used in aircraft construction such as aluminum, aluminum alloys, magnesium alloys, steel, aircraft finishes and plastic materials; which maintains its de-icing properties either in thin films or thickened masses; which is non-inflammable and non-toxic to any considerable extent; which has a low pour point; and which may be readily prepared for use.

The composition which meets the requirements as mentioned in the stated objects is formed of lithium chloride combined with ingredients making the chloride usable as a film coating for various exposed base surfaces and facilitating application and coating maintenance. A satisfactory parts listing includes:

|  | Parts by weight | Ranges |
|---|---|---|
| Lithium chloride | 39.0 | 5.0–45.0 |
| Water | 60.0 | 55.0–95.0 |
| Potassium Chromate | 1.0 | 0.2– 3.0 |
| Carboxy methyl cellulose | 0.8 | 0.1– 2.0 |
| Wetting agent | 0.5 | 0.1– 1.0 |

Of these parts, water is used as a solvent to obtain ease and economy of application of the lithium chloride as a film; and, while water is ordinarily preferred, other solvents, such as the glycols or glycol-ethers, may be used.

Potassium chromate is desirable where the base surfaces are susceptible to corrosion, the chromate acting as a corrosion inhibitor. For example, base metals such as steel, cast iron, and magnesium require corrosion protection. Other inhibitors may be used, such as sodium dihydrogen phosphate, sodium perborate, pyridine and sodium arsenite, but potassium chromate is most effective for general uses.

The purpose of the carboxymethyl cellulose in the composition is to supply body by increasing the viscosity of the aqueous solutions. The requirement of this substance is that it be compatible with the concentrated salt solution of the lithium chloride so as to avoid precipitation. Other similar usable agents for this purpose are polyvinyl alcohol, methyl cellulose and members of the pectin and algin groups.

The wetting agent aids in spreading the de-icing material over the desired surfaces, and this agent is practically mandatory where the surfaces are many and large and not at the time ice-coated. Where the surfaces are ice-coated, however, the de-icer spreads readily but, in general, it is desirable to include the spreading agent. For this purpose the commercial product Triton X–100 is found to give good results. This product is an alkylated aryl polyether alcohol, or, more specifically iso-octyl phenyl ether of polyethylene glycol.

The essential de-icing agent in the composition is lithium chloride and, while other salts of lithium, such as the bromide and acetate, are useful none completely approach the chloride in its unique effectiveness as a de-icer. The following capability of lithium chloride for de-icing has been established as follows:

| Temperature | Contact Time, minutes | Percent Ice Melted | Inches of Ice Melted |
|---|---|---|---|
| 25° F | 10 | 83.0 | 0.158 |
| —15° F | 10 | 57.7 | 0.110 |

When applied in the form of the specified composition to exposed surfaces it is found to be effective as a thin film or in massive layers; it is operative to remove ice in the temperature range of 32° F. to —15° F.; after removal of ice it prevents ice formation from one-half to ten hours depending on the amount of precipitation encountered; it has a pour point less than —15° F.; it does not crystallize or separate in the range —15° F. to 170° F.; it is non-inflammable and non-toxic to a pronounced extent; it is readily prepared for use and may be used ready mixed or in a form usable after mixing with water; and the cost is low.

The reasons for the effectiveness of the lithium chloride composition as a de-icer are not clearly understood; but it may be due to the small size of the lithium ion as well as to the high solubility of the chloride with water. Quantitative determinations made on numerous salts capable of depressing the freezing point, showed that lithium chloride exhibited the least change in rate of solution in water with temperature. In other words, the rate of solution in water of this chloride shows the least reduction as the temperature is decreased.

Since modifications may be made of the invention as disclosed it is to be understood that within the scope of the appended claims the invention may be practiced otherwise than as specifically described.

What is claimed is:

1. A de-icing composition comprising essentially in parts by weight lithium chloride 5.0 to 45.0, a solvent therefor 55.0 to 95.0, and a bodying agent 0.1 to 2.0 compatible with said lithium chloride.

2. A de-icing composition comprising essentially in parts by weight lithium chloride 39.0, water 60.0, potassium chromate 1.0, and carboxymethyl cellulose 0.8.

3. A de-icing composition comprising essentially in parts by weight lithium chloride 5.0 to 45.0, water 55.0 to 95.0, potassium chromate 0.2 to 3.0, carboxymethyl cellulose 0.1 to 2.0, and a wetting agent 0.1 to 1.0.

4. A de-icing composition comprising essentially in parts by weight lithium chloride 5.0 to 45.0, water 55.0 to 95.0, and carboxymethyl cellulose 0.1 to 2.0.

5. A de-icing composition comprising essentially in parts by weight lithium chloride 39.0, water 60.0, potassium chromate 1.0, carboxymethyl cellulose 0.8, and iso-octyl phenyl ether of polyethylene glycol 0.5.

6. A de-icing composition comprising essentially in parts by weight lithium chloride 5.0 to 45.0, water 55.0 to 95.0, a bodying agent compatible with lithium chloride 0.1 to 2.0, and a wetting agent compatible with lithium chloride 0.1 to 1.0.

7. A de-icing composition comprising essentially in parts by weight lithium chloride 5.0 to 45.0, water 55.0 to 95.0, and a bodying agent 0.1 to 2.0 selected from the group consisting of carboxymethyl cellulose, polyvinyl alcohol, and methyl cellulose.

8. A de-icing composition comprising essentially in parts by weight lithium chloride 5.0 to 45.0, water 55.0 to 95.0, a bodying agent 0.1 to 2.0 characterized by compatibility with concentrated salt solutions and the property of increasing the viscosity of aqueous solutions, a corrosion inhibitor and a wetting agent, said inhibitor and wetting agent being compatible with the lithium chloride solution.

9. A de-icing composition comprising essentially in parts by weight lithium chloride 5.0 to 45.0, a solvent therefor, and a bodying agent 0.1 to 2.0 selected from the group consisting of carboxymethyl cellulose, polyvinyl alcohol, and methyl cellulose.

10. The de-icing composition as defined in claim 9 including additionally a corrosion inhibitor and a wetting agent, said inhibitor and wetting agent being compatible with the lithium chloride solution.

References Cited in the file of this patent

UNITED STATES PATENTS

| | | |
|---|---|---|
| 2,035,219 | Booth | Mar. 24, 1936 |
| 2,462,970 | Holtzclaw | Mar. 1, 1949 |
| 2,469,309 | Morris et al. | May 3, 1949 |

OTHER REFERENCES

"Technical Note No. 345 of National Advisory Committee for Aeronautics," July 1930, pp. 6–19.